US009478811B2

(12) United States Patent
Ando et al.

(10) Patent No.: US 9,478,811 B2
(45) Date of Patent: Oct. 25, 2016

(54) SOLID OXIDE FUEL CELL AND METHOD FOR PRODUCING THE SAME

(71) Applicant: TOTO LTD., Kitakyushu-shi, Fukuoka (JP)

(72) Inventors: Shigeru Ando, Odawara (JP); Osamu Okamoto, Chigasaki (JP); Kiyoshi Hayama, Fujisawa (JP); Seiki Furuya, Fujisawa (JP); Yutaka Momiyama, Yokohama (JP); Nobuo Isaka, Yokohama (JP); Masaki Sato, Fujisawa (JP); Shuhei Tanaka, Chigasaki (JP); Takuya Hoshiko, Kanagawa (JP); Naoki Watanabe, Chigasaki (JP); Yasuo Kakinuma, Chigasaki (JP)

(73) Assignee: TOTO LTD., Fukuoka (JP)

( * ) Notice: Subject to any disclaimer, the term of this patent is extended or adjusted under 35 U.S.C. 154(b) by 323 days.

(21) Appl. No.: 14/229,185

(22) Filed: Mar. 28, 2014

(65) Prior Publication Data
US 2014/0295317 A1  Oct. 2, 2014

(30) Foreign Application Priority Data

Mar. 28, 2013 (JP) ................... 2013-068955
Mar. 27, 2014 (JP) ................... 2014-066708

(51) Int. Cl.
*H01M 8/02* (2016.01)
*H01M 8/12* (2016.01)
(Continued)

(52) U.S. Cl.
CPC ............ *H01M 8/0236* (2013.01); *C04B 35/20* (2013.01); *C04B 38/067* (2013.01); *H01M 8/0243* (2013.01); *H01M 8/0245* (2013.01); *H01M 8/0252* (2013.01); *H01M 8/1097* (2013.01); *H01M 8/124* (2013.01); *H01M 8/1226* (2013.01); *C04B 2111/00853* (2013.01); *C04B 2111/00913* (2013.01); *C04B 2235/3208* (2013.01); *C04B 2235/72* (2013.01); *H01M 4/8621* (2013.01); *H01M 4/8885* (2013.01); *H01M 4/905* (2013.01); *H01M 4/9025* (2013.01); *H01M 4/9066* (2013.01); *H01M 8/004* (2013.01); *H01M 8/0637* (2013.01);
(Continued)

(58) Field of Classification Search
None
See application file for complete search history.

(56) References Cited

U.S. PATENT DOCUMENTS 6,844,098 B1   1/2005   Ishihara et al.
7,033,690 B1   4/2006   Akikusa et al.
(Continued)

FOREIGN PATENT DOCUMENTS

JP   11-335164 A    12/1999
JP   2002-015756 A   1/2002
(Continued)

OTHER PUBLICATIONS

Extended Search Report issued on European application No. 14162159.9 on Jun. 25, 2014, 7 pages.
Examination Report in corresponding European Application No. 14 162 159.9, dated Apr. 23, 2015, 5 pages.

*Primary Examiner* — Scott J Chmielecki
(74) *Attorney, Agent, or Firm* — Brinks Gilson & Lione

(57) ABSTRACT

Provided is a solid oxide fuel cell which includes a fuel electrode, a solid electrolyte, and an air electrode, each being sequentially laminated on the surface of a porous support. The porous support comprises forsterite and a nickel element. Ni and/or NiO fine particles are exposed on a surface of a sintered compact of the forsterite constituting the porous support.

14 Claims, 8 Drawing Sheets

(51) Int. Cl.
    *H01M 8/10*     (2016.01)
    *C04B 35/20*     (2006.01)
    *C04B 38/06*     (2006.01)
    H01M 4/86     (2006.01)
    H01M 4/90     (2006.01)
    H01M 8/00     (2016.01)
    H01M 4/88     (2006.01)
    H01M 8/06     (2016.01)
    C04B 111/00     (2006.01)

(52) U.S. Cl.
    CPC .. *H01M 8/1246* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 8,691,172 | B2 | 4/2014 | DeSanto et al. |
| 2011/0008234 | A1 | 1/2011 | DeSanto et al. |
| 2012/0121999 | A1* | 5/2012 | Laurencin ............ H01M 4/861 |
| | | | 429/423 |

FOREIGN PATENT DOCUMENTS

| | | | |
|---|---|---|---|
| JP | 2005-093241 A | | 4/2005 |
| JP | 2005093241 A | * | 4/2005 |
| JP | 2005340164 A | | 12/2005 |
| JP | 2013/026647 A1 | | 2/2013 |

\* cited by examiner

SOLID OXIDE FUEL CELL AND METHOD FOR PRODUCING THE SAME

RELATED APPLICATIONS

This application claims priority under 35 U.S.C. §119 to Japanese Patent Application Nos. 2013-068955 filed on Mar. 28, 2013 and 2014-066708 filed on Mar. 27, 2014, the entire contents of which are hereby incorporated by reference.

BACKGROUND OF THE INVENTION

1. Field of the Invention

The present invention relates to a solid oxide fuel cell and a method for producing the same.

2. Description of the Related Art

In order to provide a solid oxide fuel cell at a low cost, it has been proposed that a support is prepared from a forsterite-based sintered compact (see Japanese Patent Application Publication No. 2005-93241).

JP-A-2005-93241 discloses that it is possible to prevent cracks and gas leakage in the fuel cell by bringing the thermal expansion coefficient of the support prepared from the forsterite-based sintered compact close to that of the solid electrolyte. Additionally, JP-A-2005-93241 discloses that nickel is added to the forsterite-based sintered compact, so that the support contains nickel to thereby be adjusted in the thermal expansion coefficient, and to be increased in the bonding strength to power generating elements such as an electrolyte layer.

SUMMARY OF THE INVENTION

In the development of solid oxide fuel cells, studies on solid oxide fuel cells employing a solid electrolyte active at low temperature, for example, an LSGM-based solid electrolyte have been conducted with the advancement of improvement of solid electrolyte.

Meanwhile, carbon monoxide is difficult to combust as a fuel at a temperature of 700° C. or lower. Accordingly, a solid electrolyte active at low temperature, in particular, has failed to fully utilize carbon monoxide, generated in a steam reforming reaction and the like, for a power generating reaction. For this reason, studies have been carried out to dramatically improve the efficiency of utilizing a raw fuel through a shift reaction ($CO+H_2O \rightarrow H_2+CO_2$) by which CO is reformed into $H_2$ consumable in the power generating reaction.

An object of the present invention is to produce a cell employing forsterite as a main component of a porous support, the cell dramatically improving the efficiency of utilizing a raw fuel by reforming (i.e., enabling a shift reaction) unreformed fuel gas in the porous support. Another object is to dramatically improve the efficiency of utilizing a raw fuel particularly in a cell employing a solid electrolyte active at low temperature such as LSGM.

The present inventors have tried to achieve the above-described objects by mixing forsterite as the main component of a porous support with a nickel element (hereinafter, referred to as Ni) known as a reforming catalyst of a shift reaction. To obtain a sufficient effect of Ni as a reforming catalyst of a shift reaction, Ni fine particles are desirably exposed on a surface of a sintered compact of forsterite constituting a porous support. Nevertheless, the inventors have observed that if a porous support contains a certain amount of a calcium element (hereinafter, referred to as Ca), a solid solution is formed by the reaction between Ca and Ni.

In the case where Ca and Ni form a solid solution, the Ni fine particles are not exposed on the surface of the sintered compact of forsterite constituting the porous support. The inventors have found that, in this case, the effect of Ni as a reforming catalyst of a shift reaction is no longer demonstrated.

Thus, in the present invention, the Ca concentration in a porous support is adjusted to make Ni fine particles exposed on a surface of a sintered compact of forsterite constituting the porous support.

One aspect of the present invention provides a solid oxide fuel cell comprising a porous support, a fuel electrode, a solid electrolyte, and an air electrode, each of the fuel electrode, the solid electrolyte, and the air electrode being sequentially laminated on a surface of the porous support. In the solid oxide fuel cell, the porous support contains forsterite and a nickel element, and Ni and/or NiO fine particles are exposed on a surface of a sintered compact of the forsterite, the sintered compact constituting the porous support.

In one aspect of the present invention, the surface of the sintered compact of the forsterite is a gas flow path side surface of the porous support.

This ensures that a shift reaction takes place with Ni as a reforming catalyst.

In one aspect of the present invention, a concentration of the exposed Ni and/or NiO fine particles of an upstream side region of the porous support with regard to the gas flow passage is higher than a concentration of the exposed Ni and/or NiO fine particles of a downstream side region thereof. Note that the term "upstream side" with regard to the gas flow passage means a side where a gas flows into the gas flow passage, and the term "downstream side" with regard to the gas flow passage means a side where a gas is discharged from the gas flow passage.

Thereby, at the upstream side region of the porous support where there are a lot of Ni atoms, the shift reaction that is an exothermic reaction takes place more frequently than at the downstream side thereof. Thus, the temperature unevenness of the cell at startup (i.e., at the startup, ignition is brought about at a downstream end of the cell, so that the temperature has been low at the upstream side of the cell) can be quickly eliminated as heat is generated more at the upstream side.

In one aspect of the present invention, the Ni and/or NiO fine particles have a particle diameter of 1 nm to 200 nm both inclusive.

This makes it possible to increase the specific surface area of the Ni and/or NiO fine particles to enhance the efficiency of the shift reaction.

In one aspect of the present invention, the porous support contains the forsterite, the nickel element, and a calcium element, the calcium element concentration is more than 0 mass % but not more than 1 mass % in terms of CaO, and [CaO]/[NiO] is more than 0 but not more than 0.03 by mass ratio in at least one region of the porous support. Note that [CaO]/[NiO] means a ratio of the concentration of the calcium element in terms of CaO in the porous support to the concentration of the nickel element in terms of nickel oxide (NiO) in the porous support.

By adjusting the concentration of Ca present in the porous support to relatively low in this manner, it is possible to make the Ni and/or NiO fine particles present in the surface of the sintered compact of the forsterite constituting the porous support, and to increase the efficiency of the shift reaction.

In one aspect of the present invention, the at least one region is a gas flow passage side surface of the porous support.

This ensures that the shift reaction more reliably takes place with Ni as the reforming catalyst.

In one aspect of the present invention, the at least one region is the upstream side region of the porous support with regard to the gas flow passage.

Thereby, at the upstream side region of the porous support where there are a lot of Ni atoms, the shift reaction that is an exothermic reaction takes place more frequently than at the downstream side region thereof. Thus, the temperature unevenness of the cell at startup (i.e., at the startup, ignition is brought about at a downstream end of the cell, so that the temperature has been low at the upstream side of the cell) can be quickly eliminated as heat is generated more at the upstream side.

In one aspect of the present invention, the porous support has a calcium element concentration of more than 0 mass % but not more than 0.2 mass % in terms of CaO in a fuel electrode side surface of the porous support.

Ca contained in the porous support is presumably a substance causing a dopant Sr contained in LSGM to be separated from the crystal, the LSGM being preferable as a component constituting the solid electrolyte. The lower Ca concentration in the fuel electrode side surface of the porous support prevents the separation of Sr, and makes it possible to maintain the crystal structure of the lanthanum-gallate-based oxide even after the firing.

In one aspect of the present invention, the porous support includes at least two layers.

Such a layered structure can include a layer having a low Ca concentration and another layer having high strength with a relatively high Ca concentration, the Ca concentration being attributable to the separation of the dopant from the solid electrolyte. Hence, a high-performance cell can be readily produced.

One aspect of the present invention provides a method for producing a porous support for a solid oxide fuel cell comprising the porous support, a fuel electrode, a solid electrolyte, and an air electrode, each of the fuel electrode, the solid electrolyte, and the air electrode being sequentially laminated on a surface of the porous support, the method including: (a) forming a compact comprising forsterite and a nickel element; and (b) firing the compact. The porous support further has a calcium element concentration of more than 0 mass % but not more than 1 mass % in terms of calcium oxide (CaO). [CaO]/[NiO] is more than 0 but not more than 0.03 by mass ratio in at least one region of the porous support. In addition, provided is a method for producing a solid oxide fuel cell, the method including forming a fuel electrode, a solid electrolyte, and an air electrode sequentially on the surface of the porous support.

In one aspect of the present invention, the forming (a) includes: (a1) forming a preform by molding a green body comprising forsterite; and (a2) incorporating a nickel element into a surface of the preform.

In one aspect of the present invention, the incorporating (a2) includes applying a slurry containing a compound comprising a nickel element, a solution containing a compound comprising a nickel element, or a green body comprising a nickel element to the surface of the preform.

One aspect of the present invention provides a method for producing a solid oxide fuel cell comprising a porous support, a fuel electrode, a solid electrolyte, and an air electrode, each of the fuel electrode, the solid electrolyte, and the air electrode being sequentially laminated on a surface of the porous support, the method including: (a) forming and then firing a compact comprising forsterite and a nickel element to thereby form the porous support, the firing including forming the fuel electrode and the solid electrolyte on the surface of the porous support; and (b) forming the air electrode on a surface of the solid electrolyte. The porous support further has a calcium element concentration of more than 0 mass % but not more than 1 mass % in terms of calcium oxide (CaO). [CaO]/[NiO] is more than 0 but not more than 0.03 by mass in at least one region of the porous support.

In one aspect of the present invention, the forming (a) includes: (a1) forming a preform by molding a green body comprising forsterite; (a2) forming a laminate by coating a surface of the preform with a slurry for fuel electrode and a slurry for solid electrolyte, and by incorporating a nickel element into a surface of the preform different from the surface which is coated with the slurries; and (a3) firing the laminate.

According to the present invention, Ni serving as the catalyst of the shift reaction is exposed in the form of fine spherical particles on the surface of the sintered compact of the forsterite constituting the porous support, so that the shift reaction efficiently takes place. Thus, the present invention makes it possible to dramatically improve the efficiency of utilizing a raw fuel.

DETAILED DESCRIPTION OF THE PREFERRED EMBODIMENTS

Figure 1:
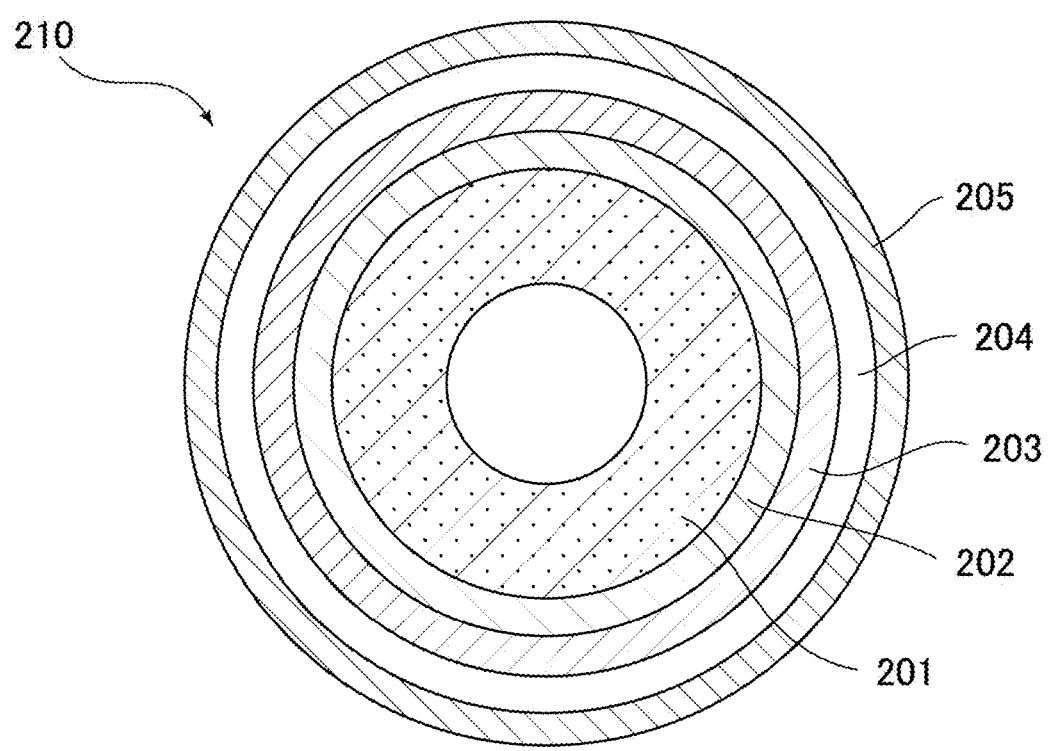
FIG. 1 is a schematic view showing one aspect of a cross section of a solid oxide fuel cell of the present invention.

A solid oxide fuel cell of the present invention includes a fuel electrode serving as an inner electrode, a solid electrolyte, and an air electrode serving as an outer electrode, each of which is sequentially laminated on the surface of a porous support. The fuel cell of the present invention is not limited to have particular shapes. The fuel cell may have for Example a cylindrical shape, a planar shape, a hollow planar shape in which multiple gas flow passages are formed, or other similar shapes. Since the porous support of the fuel cell of the present invention is an insulating support, horizontal stripe type cells are preferable in which multiple power generating elements are formed in series on one porous support. Here, the power generating elements mean a laminate having a fuel electrode, a solid electrolyte, and an air electrode, each of which is sequentially laminated.

In the fuel cell of the present invention, the porous support contains forsterite, and further contains a nickel element (Ni). The nickel element is exposed in the form of Ni and/or NiO fine particles on the surface of a sintered compact of the forsterite. The porous support preferably contains a calcium element (Ca). The calcium element concentration in the porous support is more than 0 mass % but not more than 1 mass %, preferably more than 0 mass % but not more than 0.4 mass %, in terms of calcium oxide (CaO). Preferably, the porous support consists essentially of forsterite, a nickel element, and a calcium element.

In the fuel cell of the present invention, as the forsterite used for the porous support, it is preferable to use a material containing a Mg element in terms of MgO and a Si element in terms of $SiO_2$ in total of 90 mass %, preferably 95 mass %, more preferably 98 mass % or more. In the fuel cell of the present invention, it is more preferable that such a material have a sum of peak tops of crystal components other than forsterite crystal of 5 or less, wherein the peak top of the forsterite crystal obtained by X-ray diffraction is 100.

In one embodiment of the present invention, [CaO]/[NiO], that is, a ratio of the concentration of the calcium element in terms of CaO to the concentration of the nickel element in terms of nickel oxide (NiO), is more than 0 but not more than 0.03 by mass, preferably is 0.02 or less, in at least one region of the porous support. The at least one region is preferably a gas flow passage side surface of the porous support or an upstream side region of the porous support with regard to the gas flow passage and more preferably an upstream side surface of the porous support with regard to the gas flow passage. Note that in a case where a nickel compound other than NiO is blended, the compound is converted to NiO for the calculation. Additionally, in a case where a Ni metal is blended, the metal is converted to NiO for the calculation likewise.

In another embodiment of the present invention, the porous support may have a calcium element concentration of more than 0 mass % but not more than 0.2 mass % in terms of CaO in a fuel electrode side surface of the porous support.

The reason why the relatively low concentration of the calcium element in the porous support can enhance the efficiency of a shift reaction is presumably as follows, but is not limited thereto. Probably, in the porous support, a calcium element is present as a glass phase in a sintered compact of forsterite. If a glass phase containing a calcium element is present in a sintered compact of forsterite, the nickel element contained in the porous support reacts with the glass phase containing a calcium element during sintering to thereby form a compound. The more the glass phases containing a calcium element are present, the more likely the nickel element reacts with the glass phases containing a calcium element to form the compounds. Even if exposed to a reducing atmosphere, the nickel element forming the compound is hardly deposited as a Ni metal from the compound, and hardly exposed on the surface of a sintered compact of forsterite. Hence, if the concentration of a calcium element present in a porous support is high, it is more likely that the glass phase is present in a sintered compact of forsterite, so that only a small amount of the Ni metal is exposed on the surface of the sintered compact of the forsterite. In such a case, since the specific surface area of the Ni metal is small, it is less likely that the Ni metal comes into contact with fuel gas, and a favorable reforming reaction does not take place. In one embodiment of the present invention, the low concentration of the calcium element present in the porous support decreases the amount of the glass phase present in the sintered compact of the forsterite, and increases the specific surface area of Ni fine particles to be deposited. As a result, it is more likely that the Ni metal comes into contact with fuel gas is presumably increased, so that a favorable reforming reaction takes place.

Herein, the concentration of the nickel element in terms of NiO and the concentration of the calcium element in terms of CaO are measured as follows.

Measurement of Ni Concentration

A measurement sample is prepared by dividing a fuel cell into two pieces to measure Ni concentration on a surface (preferably the gas flow passage side surface) of the porous support. The instrument used is an X-ray analytical microscope (for example, product name: XGT-5000, maker: HORIBA, Ltd.), one of X-ray fluorescence spectrometers (XRF).

The measurement conditions are as follows.
Measurement time: 100 seconds
Pulsing time: P3
Diameter of field of view measured: 1.2 mm
X-ray tube voltage: 50 kV
Current: 0.032 mA
X-ray filter: none
Quantification: one point calibration curve method.

Measurement of Ca Concentration

The surface (preferably the gas flow passage side surface) of the porous support, the surface having an area of 3 cm×5 cm, is ground off to the depth of 100 μm. The resulting powder is mixed with lithium tetraborate in a ratio of 1:1 (mass), and a (φ30-mm disc is prepared by pressing. The instrument used is an X-ray fluorescence spectrometer (XRF) (for example, instrument name: scanning X-ray fluorescence spectrometer, product name: ZSX Primus II, maker: Rigaku Corporation).

The measurement conditions are as follows.
Target: Rh
Tube voltage-tube current: 40 KV-75 mA
Analyzing crystal: LiF
Scan range: 110 deg to 116 deg
Quantification: one point calibration curve method
Reference material: JCRM R 901 talc powder which is a certified reference material by the Ceramic Society of Japan.

A plurality of Ni and/or NiO fine particles is exposed on the surface of the sintered compact of the forsterite constituting the porous support. In one embodiment of the present invention, the Ni and/or NiO fine particles have a particle diameter of 1 nm to 200 nm both inclusive, preferably 1 nm to 100 nm both inclusive, more preferably 1 nm to 50 nm both inclusive.

The particle diameter is measured using a scanning electron microscope (for example, S-4100 manufactured by Hitachi, Ltd.).

The measurement conditions are: an accelerating voltage of 15 kV; a magnification of 20,000 or 30,000; secondary electron images.

Major axes of the fine particles are determined from the images.

The Ni and/or NiO fine particles exposed on the surface of the sintered compact of the forsterite are presumably deposited as follows. First, Ni and Ca in the predetermined concentrations are incorporated into the porous support, and thereby, for example, the forsterite ($Mg_2SiO_4$) crystals are doped with NiO during sintering. Then, the porous support is subjected to a reduction treatment (for example, brought into contact with fuel gas at high temperature), and some of the NiO dopant are reduced to a Ni metal. In this event, the Ni metal is deposited from the solid solution because the sintered compact of the forsterite cannot be doped with a Ni metal. In the case where a nickel compound other than NiO is blended also, once the forsterite crystals are doped with the nickel element, some of the nickel compound are then turned to a Ni metal under a reducing condition, and deposited from the solid solution.

The Ni and/or NiO fine particles exposed on the surface of the sintered compact of the forsterite are preferably small particles in comparison with the particle diameter of Ni or a nickel compound such as NiO added as the raw material. For this reason, the Ni and/or NiO fine particles exposed on the surface of the sintered compact of the forsterite presumably have a large specific surface area. As a result, it is more likely that the Ni metal comes into contact with fuel gas is increased, and a favorable reforming reaction takes place. For example, the "Ni fine particles" and the "NiO fine particles" may have a particle diameter not larger than $2/3$, preferably not larger than $1/3$, of the particle diameter of Ni or NiO added as the raw material, but the particle diameter is not limited thereto.

Note that if the nickel element is added in an excessive amount, a portion of the nickel element which has exceeded the solid-solubility limit is present in the form of NiO particles among particles mainly of the forsterite constituting the sintered compact during firing. Then, after the porous support is subjected to the reduction treatment, some of the NiO fine particles are reduced to a Ni metal. The solid oxide fuel cell of the present invention may contain such particles.

The nickel element concentration distribution in the porous support may be uniform, or may not be uniform. The concentration of the nickel element in the gas flow passage side surface of the porous support is preferably higher than the quantity of the nickel element in the gas flow passage side surface of the porous support, where the gas flow path passage side surface of the porous support is opposite to the fuel electrode side surface of the porous support. Meanwhile, the nickel element concentration in the porous support may have a gradation toward the gas flow passage side surface of the porous support. Alternatively, the porous support may be a laminate having two or more layers, each having different nickel element concentrations. The nickel element may be present all over the gas flow passage side surface of the porous support. The nickel element may be present in one region of the porous support with regard to the gas flow passage, in other words, may be biased at the upstream side region or the downstream side region of the porous support with regard to the gas flow passage.

Preferably, the concentration of Ni and/or NiO fine particles in the upstream side region of the porous support with regard to the fuel flow passage are higher than the concentration of Ni and/or NiO fine particles in the downstream side region of the porous support with regard to the fuel flow passage.

The porous support is obtained by preparing a compact comprising forsterite and a predetermined amount of a nickel element, and then firing the compact. Specifically, a method is employed in which a nickel compound is added so that the nickel element concentration in the compact may be within the predetermined range. As the nickel compound, for example, nickel oxide (NiO) or a nickel compound soluble to a solvent such as water can be used. The nickel compound is preferably nickel oxide, but is not limited thereto.

Another method for obtaining the porous support includes a method including: preparing a preform by molding a green body comprising forsterite; incorporating a nickel element into a surface of the preform; and then firing the preform. The preform may be prepared by molding a green body comprising forsterite, and then drying and heat treating the green body. The method for incorporating the nickel element into the surface of the preform includes a method in which a slurry containing a nickel compound or a solution containing a nickel compound is impregnated into the preform, a method in which the preform is coated with a slurry containing a nickel compound or a solution containing a nickel compound, and a method in which a green body comprising forsterite and a nickel element is laminated on the preform, but is not limited thereto.

In the present description, the term "impregnating" and related terms, as in Example 1 to be described later, includes a method in which a compact is immersed in a slurry or a solution, and a method in which a slurry or a solution is poured onto a compact, but are not limited thereto.

In the present description, the term "coating" and related terms includes brushing, spraying, and printing, but are not limited thereto.

In one embodiment of the present invention, the porous support may include at least two layers.

In the solid oxide fuel cell of the present invention, the fuel electrode is present as an inner electrode. When the inner electrode is a fuel electrode, the outer electrode is an air electrode.

The fuel electrode may be made of NiO/zirconium-containing oxide, NiO/cerium-containing oxide, or the like, but is not limited thereto. Here, the NiO/zirconium-containing oxide means one obtained by uniformly mixing NiO with a zirconium-containing oxide in a predetermined ratio. The NiO/cerium-containing oxide means one obtained by uniformly mixing NiO with cerium-containing oxide in a predetermined ratio. The zirconium-containing oxide in the NiO/zirconium-containing oxide includes zirconium-containing oxides doped with one or more of CaO, $Y_2O_3$, and $Sc_2O_3$, and the like, but is not limited thereto. The cerium-containing oxide in the NiO/cerium-containing oxide includes ones represented by the general formula $Ce_{1-y}Ln_yO_2$, where Ln is any one of or a combination of two or more of La, Pr, Nd, Sm, Eu, Gd, Tb, Dy, Ho, Er, Tm, Yb, Lu, Sc, and Y, $0.05 \leq y \leq 0.50$. But the cerium-containing oxide is not limited thereto. Note that since NiO is reduced under a fuel atmosphere and turned into Ni, the mixture becomes Ni/zirconium-containing oxide or Ni/cerium-containing oxide. The fuel electrode may be composed of a single layer or multiple layers. In the case where the fuel electrode includes multiple layers, Ni/YSZ (yttria-stabilized zirconia) may be used for a layer at the support side while Ni/GDC ($Gd_2O_3$–$CeO_2$) (=fuel electrode catalyst layer) may be used for a layer at the solid electrolyte side.

The air electrode may be made of a lanthanum-cobalt-based oxide such as $La_{1-x}Sr_xCoO_3$ (where x=0.1 to 0.3) or $LaCo_{1-x}Ni_xO_3$ (where x=0.1 to 0.6), a lanthanum-ferrite-based oxide ($La_{1-m}Sr_mCo_{1-n}Fe_nO_3$ (where $0.05<m<0.50$, $0<n<1$)) which is a solid solution of (La, Sr)$FeO_3$ and (La, Sr)$CoO_3$, or the like. But the air electrode is not limited thereto. The air electrode may be composed of a single layer or multiple layers. In the case where the air electrode includes multiple layers, $La_{0.6}Sr_{0.4}Co_{0.2}Fe_{0.8}O_3$ (=air electrode catalyst layer) may be used for a layer at the solid electrolyte side, and $La_{0.6}Sr_{0.4}Co_{0.8}Fe_{0.2}O_3$ (=air electrode) may be used for the outermost layer.

In the solid oxide fuel cell of the present invention, the solid electrolyte may be made of lanthanum-gallate-based oxide, stabilized zirconia doped with one or more of Y, Ca, and Sc. But the solid electrolyte is not limited thereto. The solid electrolyte preferably includes lanthanum-gallate-based oxide doped with Sr and Mg, more preferably lanthanum-gallate-based oxide (LSGM) represented by the general formula $La_{1-a}Sr_aGa_{1-b-c}Mg_bCo_cO_3$, where $0.05 \leq a \leq 0.3$, $0 < b < 0.3$, and $0 \leq c \leq 0.15$. A layer of cerium-based oxide as a reaction prevention layer may be disposed on the fuel electrode side of the solid electrolyte includes ceria doped with La ($Ce_{1-x}La_xO_2$ (where $0.3 < x < 0.5$)). The reaction prevention layer is preferably made of $Ce_{0.6}La_{0.4}O_2$. The solid electrolyte may be composed of a single layer or multiple layers. In the case where the solid electrolyte includes multiple layers, a reaction prevention layer such as $Ce_{0.6}La_{0.4}O_2$ may be used between the fuel electrode and a layer of the solid electrolyte made of LSGM.

FIG. 1 is a schematic view showing one aspect of a cross section of the solid oxide fuel cell of the present invention. A solid oxide fuel cell 210 in one aspect of the present invention includes, for example, a porous support 201, a (first/second) fuel electrode 202, a (first/second) solid electrolyte 203, a (first/second) air electrode 204, and a current collecting layer 205. In the solid oxide fuel cell of the present invention, the thickness of each layer is preferably: 0.5 to 2 mm for the porous support, 10 to 200 μm for the fuel electrode, 0 to 30 μm for the fuel electrode catalyst layer, 0 to 20 μm for the reaction prevention layer, 5 to 60 μm for the solid electrolyte, 0 to 30 μm for the air electrode catalyst layer, and 10 to 200 μm for the air electrode. Here, (first/second) means "being a single layer or two layers, and in the case of two layers, having a first layer and a second layer."

A method for producing the solid oxide fuel cell of the present invention is not particularly limited. The solid oxide fuel cell of the present invention can be produced, for example, as follows. A solvent (such as water or alcohol) is added to a raw-material powder containing forsterite to prepare a green body. In this event, an optional component such as a dispersant, a binder, an anti-foaming agent, or a pore forming agent may be added. The green body thus prepared is molded, dried, and then heat treated (800° C. or higher but lower than 1100° C.) to obtain a preform. A nickel element is incorporated into a surface of the obtained preform, and then fired (800° C. or higher but lower than 1400° C.) to obtain a porous support. Alternatively, a compact may be prepared by mixing forsterite with a predetermined amount of an nickel element, and molding the resulting green body comprising the forsterite and the predetermined amount of the nickel element; then, the compact is fired (800° C. or higher but lower than 1100° C.) to obtain a porous support. In this case also, a solvent and an optional component such as a dispersant, a binder, an anti-foaming agent, or a pore forming agent, may be added. As the method for molding the green body, a sheet molding method, a press molding method, an extrusion method, or the like is employed. An extrusion method is preferable to obtain a porous support in which gas flow passages are formed. When the porous support having multiple layers is formed, in addition to a method of "multilayer extrusion" in which the multiple layers are integrally extruded, a method in which the upper layer is formed by coating or printing can also be employed. The coating method includes a slurry coating method in which a raw material slurry is applied, a tape casting method, a doctor blade casting method, a transferring method, and the like. The printing method includes a screen printing method, an inkjet method, and the like. The method for incorporating the nickel element into the surface of the preform includes, as described above, a method in which a slurry or a solution containing a nickel compound is impregnated into the preform, a method in which the preform is coated with a slurry or a solution containing a nickel compound, and a method in which a green body comprising forsterite and a nickel element is laminated on the preform, but is not limited thereto.

The fuel electrode, the solid electrolyte, and the air electrode can be obtained as follows. Specifically, to each raw-material powder, a solvent (such as water or alcohol) and a molding additive such as a dispersant or a binder are added to prepare a slurry. The slurry is applied to the surface of the porous support, dried, and then fired (1100° C. or higher but lower than 1400° C.). As such a coating method, it is possible to employ the same method that can be employed for the coating with the upper layer of the porous support including multiple layers. The firing may be performed every time each layer of the electrodes and solid electrolyte is formed, but "co-firing" in which the multiple layers are fired at once is preferably performed. In addition, in order not to degrade the solid electrolyte by the diffusion of the dopant or the like, the firing is preferably performed in an oxidizing atmosphere. More preferably, a gas mixture of air and oxygen is used, and the firing is performed in such an atmosphere that the oxygen concentration is 20 mass % to 30 mass % both inclusive. Furthermore, it is preferable that the fuel electrode and the solid electrolyte be co-fired, and then the air electrode be formed on the surface of the solid electrolyte and fired at a temperature lower than the co-firing.

In producing the solid oxide fuel cell of the present invention, when the compact comprising forsterite and a nickel element is formed and then fired to form the porous support, the fuel electrode and the solid electrolyte may be formed on the surface of the porous support by the firing. Specifically, a preform is prepared by molding a green body comprising forsterite; a surface of the preform is coated sequentially with a slurry for fuel electrode and a slurry for solid electrolyte; then, a nickel element is incorporated into a surface of the preform different from the surface which is coated with the slurries; in this way, a laminate may be formed. The obtained laminate is co-fired, and then an air electrode may be formed on the surface of the solid electrolyte. Thus, a solid oxide fuel cell can be obtained, in which each of a fuel electrode, a solid electrolyte, and an air electrode is sequentially laminated on a surface a porous support. Alternatively, a nickel element is incorporated into a surface of the preform, and then a different surface of the preform different from the above surface is coated with the slurries. Preferably, a nickel element is incorporated into a surface of the preform; then, a different surface of the preform from the surface into which the nickel element is incorporated is coated sequentially with the slurry for fuel electrode and the slurry for solid electrolyte; in this way, a laminate may be formed. The obtained laminate is co-fired, and then an air electrode may be formed on the surface of the solid electrolyte.

Figure 2:
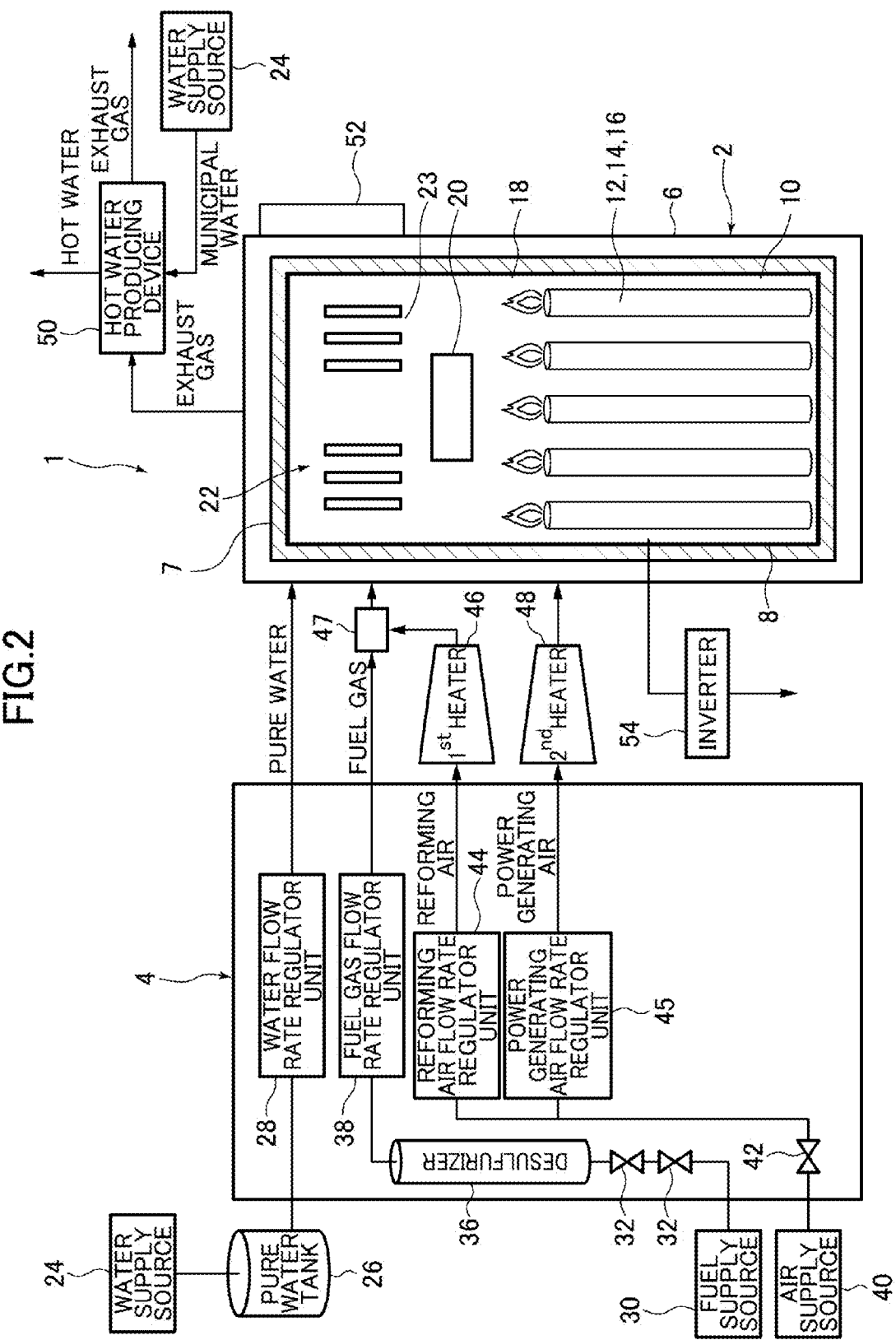
FIG. 2 is an overview diagram showing a solid oxide fuel cell system.

A solid oxide fuel cell system using the solid oxide fuel cell of the present invention is not limited to have particular structures. The production thereof, other materials, and the like may be publicly-known ones. FIG. 2 is an overview diagram showing a solid oxide fuel cell system according to one embodiment of the present invention. As shown in FIG. 2, a solid oxide fuel cell system 1 includes a fuel cell module 2 and an auxiliary unit 4.

The fuel cell module 2 includes a housing 6. The housing 6 with an insulating material 7 has a sealed space 8 therein. Note that it is acceptable not to provide the insulating material. A fuel cell assembly 12 for carrying out the power generating reaction using fuel gas and oxidizer (air) is disposed in a power generating chamber 10, which is the lower part of this sealed space 8. This fuel cell assembly 12 is furnished with ten fuel cell stacks 14 (see FIG. 4); the fuel cell stack 14 includes 16 fuel cell units 16 (see FIG. 5). Thus, the fuel cell assembly 12 has 160 fuel cell units 16, all of which are serially connected.

In the sealed space 8 of the fuel cell module 2, a combustion chamber 18 is formed above the aforementioned power generating chamber 10. In the combustion chamber 18, residual fuel gas and residual oxidizer (air) not used in the power generating reaction are combusted to produce exhaust gas. Above the combustion chamber 18, a reformer 20 for reforming fuel gas is disposed. The reformer 20 is heated by the heat of combustion of the residual gas to a temperature at which reforming reaction can take place. Above the reformer 20, an air heat exchanger 22 is disposed, which receives the heat of the reformer 20 to heat air and which reduces a decrease in the temperature of the reformer 20.

Next, the auxiliary unit 4 includes a pure water tank 26 for holding water from a water supply source 24 such as waterworks and filtering the water into pure water, and a water flow rate regulator 28 for regulating the flow rate of water supplied from the reservoir tank. The auxiliary unit 4 further includes a gas shutoff valve 32 for shutting off fuel gas such as municipal gas supplied from a fuel supply source 30, a desulfurizer 36 for desulfurizing the fuel gas, and a fuel gas flow rate regulator 38 for regulating the flow rate of the fuel gas. Furthermore, the auxiliary unit 4 includes an electromagnetic valve 42 for shutting off air as an oxidant supplied from an air supply source 40, a reforming air flow rate regulator 44 and a power generating air flow rate regulator 45 for regulating the flow rate of air, a first heater 46 for heating reforming air supplied to the reformer 20, and a second heater 48 for heating power generating air supplied to the power generating chamber. The first and second heaters 46 and 48 are provided to efficiently raise temperature at startup, but may be omitted.

Next, the fuel cell module 2 is connected to a hot-water producing device 50. The hot-water producing device 50 is supplied with exhaust gas. The hot-water producing device 50 is supplied with municipal water from the water supply source 24. This municipal water is turned into hot water by the heat of the exhaust gas and supplied to a hot water reservoir tank in an unillustrated external water heater. Moreover, the fuel cell module 2 is provided with a control box 52 for controlling the supply flow rate of the fuel gas and the like. Further, the fuel cell module 2 is connected to an inverter 54. The inverter 54 serves as an electrical power extraction unit (electrical power conversion unit) for supplying electrical power generated by the fuel cell module to the outside.

Figure 3:
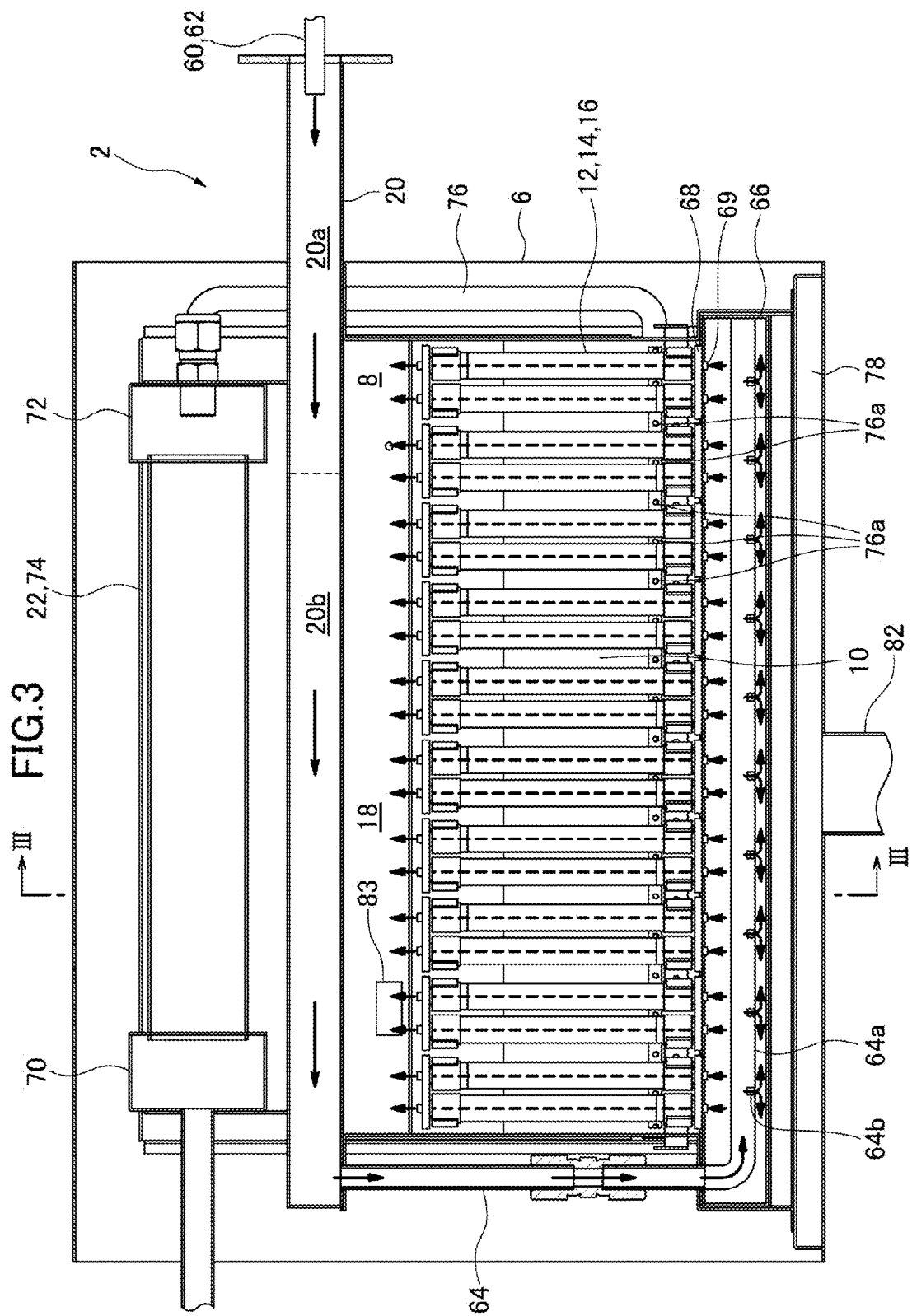
FIG. 3 is a side elevation cross section showing a fuel cell module in the solid oxide fuel cell system.
Figure 6:
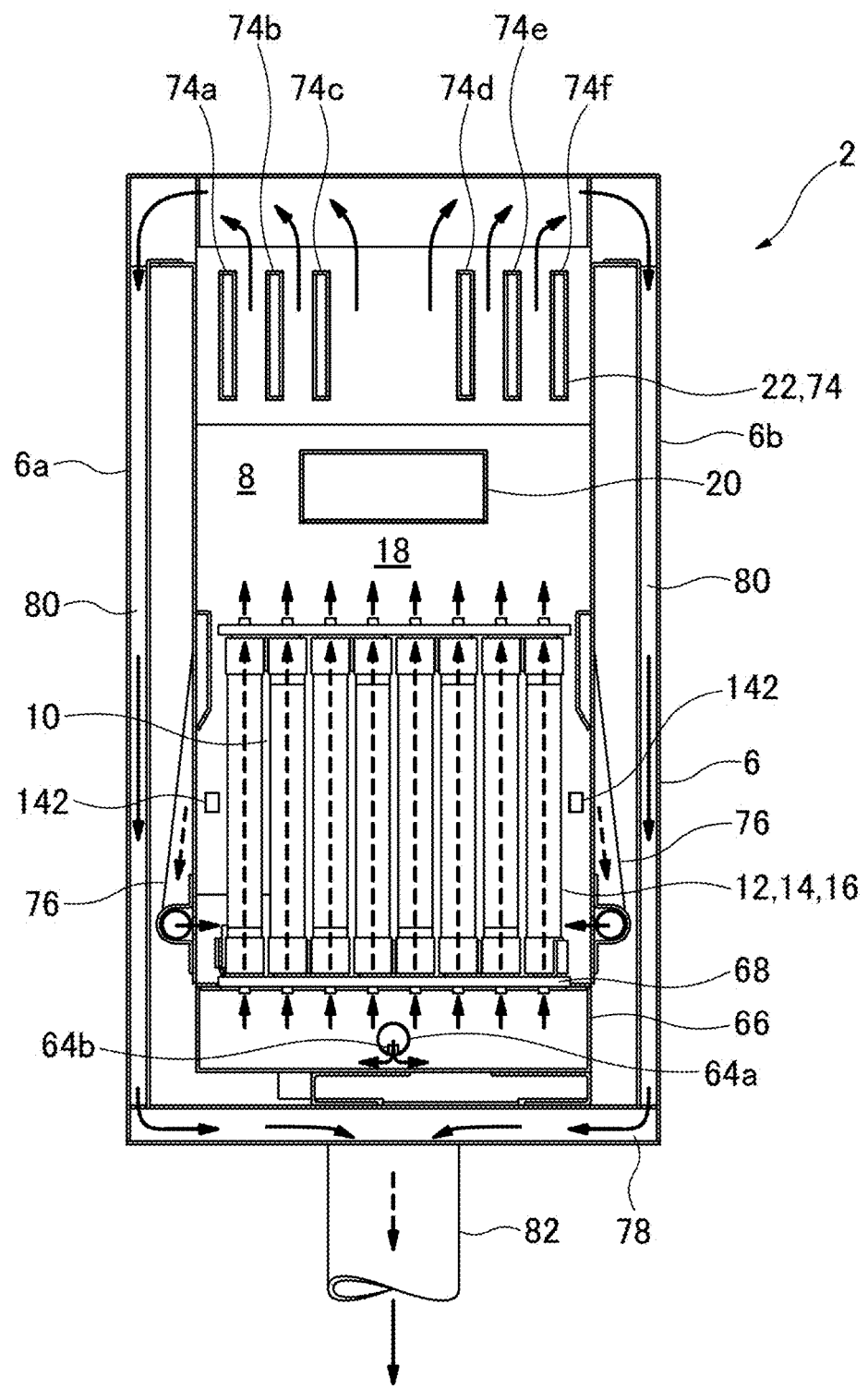
FIG. 6 is a cross section taken along the line III-III in FIG. 3.

Next, with reference to FIGS. 3 and 6, a description will be made of the internal structure of the fuel cell module of the solid oxide fuel cell system. FIG. 3 is a side elevation cross section showing the fuel cell module of the solid oxide fuel cell system. FIG. 6 is a cross section taken along line III-III in FIG. 3. As shown in FIGS. 3 and 6, the fuel cell assembly 12, the reformer 20, and the air heat exchanger 22 are arranged in sequence starting from the bottom in the sealed space 8 within the housing 6 of the fuel cell module 2 as described above.

A pure water guide pipe 60 for introducing pure water and a reformed gas guide pipe 62 for introducing fuel gas to be reformed and reforming air are attached to an upstream end of the reformer 20. Within the reformer 20, a vaporizing section 20*a* and a reforming section 20*b* are formed in sequence starting from the upstream side. The reforming section 20*b* is filled with a reforming catalyst. The fuel gas and air introduced into the reformer 20 and blended with water vapor are reformed by the reforming catalyst filled into the reformer 20.

A fuel gas supply pipe 64 is connected to a downstream end of the reformer 20. The fuel gas supply pipe 64 extends downward and further extends horizontally within a manifold 66 formed under the fuel cell assembly 12. Multiple fuel supply holes 64*b* are formed in a bottom surface of a horizontal portion 64*a* of the fuel gas supply pipe 64. Reformed fuel gas is supplied into the manifold 66 from the fuel supply holes 64*b*.

A lower support plate 68 having through holes for supporting the above-described fuel cell stacks 14 is attached to the top of the manifold 66, and fuel gas in the manifold 66 is supplied into the fuel cell unit 16.

Next, the air heat exchanger 22 is provided over the reformer 20. The air heat exchanger 22 includes an air concentration chamber 70 upstream of the exchanger and two air distribution chambers 72 downstream of the exchanger. The air concentration chamber 70 and the air distribution chambers 72 are connected through six air flow conduits 74. Here, as shown in FIG. 6, air in the air concentration chamber 70 flows from the two sets of the air flow conduits 74, each set having three air flow conduits 74 form a set (74*a*, 74*b*, 74*c*; 74*d*,74*e*,74*f*), into the respective air distribution chambers 72.

Air flowing in the six air flow conduits 74 of the air heat exchanger 22 is pre-heated by rising combustion exhaust gas from the combustion chamber 18. An air guide pipe 76 is connected to each of the air distribution chambers 72. The air guide pipe 76 extends downward. The lower end of the air guide pipe 76 communicates with a lower space in the power generating chamber 10 to introduce pre-heated air into the power generating chamber 10.

Next, an exhaust gas chamber 78 is formed below the manifold 66. As shown in FIG. 6, exhaust gas conduits 80 extending in the vertical direction are formed on the insides of a front surface 6*a* and a rear surface 6*b* which form the faces in the longitudinal direction of the housing 6. Top ends of the exhaust gas conduits 80 communicate with a space in which the air heat exchanger 22 is disposed, and bottom ends thereof communicate with the exhaust gas chamber 78. An exhaust gas discharge pipe 82 is connected to nearly a central portion of a bottom surface of the exhaust gas chamber 78. A downstream end of the exhaust gas discharge pipe 82 is connected to the aforementioned hot-water producing device 50 shown in FIG. 2. As shown in FIG. 3, an ignition device 83 for starting the combustion of fuel gas and air is provided in the combustion chamber 18.

Figure 4:
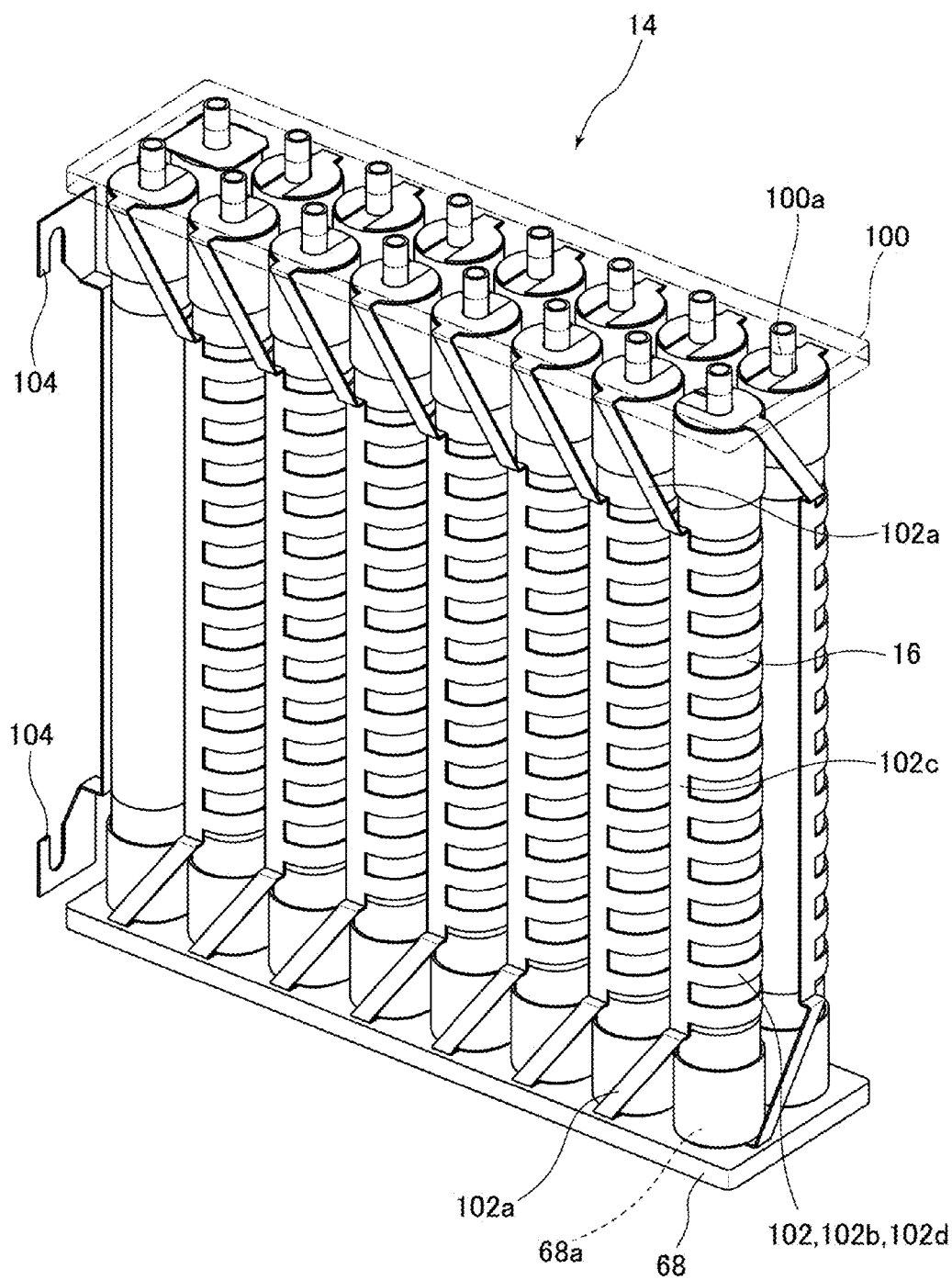
FIG. 4 is a perspective view showing a fuel cell stack in the solid oxide fuel cell system.

Next, referring to FIG. 4, the fuel cell stack 14 will be described. FIG. 4 is a perspective view showing the fuel cell stack in the solid oxide fuel cell system. As shown in FIG. 4, the fuel cell stack 14 is furnished with 16 fuel cell units 16; the top and bottom ends of these fuel cell units 16 are respectively supported by the lower support plate 68 and an upper support plate 100, which are made of ceramic. Through holes 68*a* and 100*a*, through which fuel electrode terminals 86 can penetrate, are provided on the lower support plate 68 and the upper support plate 100.

In addition, a current collector 102 and an external terminal 104 are attached to the fuel cell unit 16. The current collector 102 is integrally formed by a fuel electrode connecting portion 102*a*, which is electrically connected to the fuel electrode terminal 86 attached to an fuel electrode 90 serving as the fuel electrode, and by an air electrode connecting portion 102*b*, which is electrically connected to the entire external perimeter of an air electrode 92 serving as the air electrode. The air electrode connecting portion 102b is formed of a vertical portion 102c extending in the vertical direction along the surface of the air electrode 92, and multiple horizontal portions 102d extending in the horizontal direction from the vertical portion 102c along the surface of the air electrode 92. The fuel electrode connecting portion 102a extends linearly in an upward or downward diagonal direction from the vertical portion 102c of the air electrode connecting portion 102b toward the fuel electrode terminals 86 positioned in the upper and lower directions on the fuel cell unit 16.

Furthermore, the fuel electrode terminals 86 at the top and bottom ends of the two fuel cell units 16 positioned at the end of the fuel cell stack 14 (at the front and back sides on the left edge in FIG. 4) are respectively connected to the external terminals 104. These external terminals 104 are connected to other external terminals 104 (not shown) of the fuel cell units 16 at the ends of the adjacent fuel cell stack 14, and as described above, all of the 160 fuel cell units 16 are connected in series.

Figure 5:
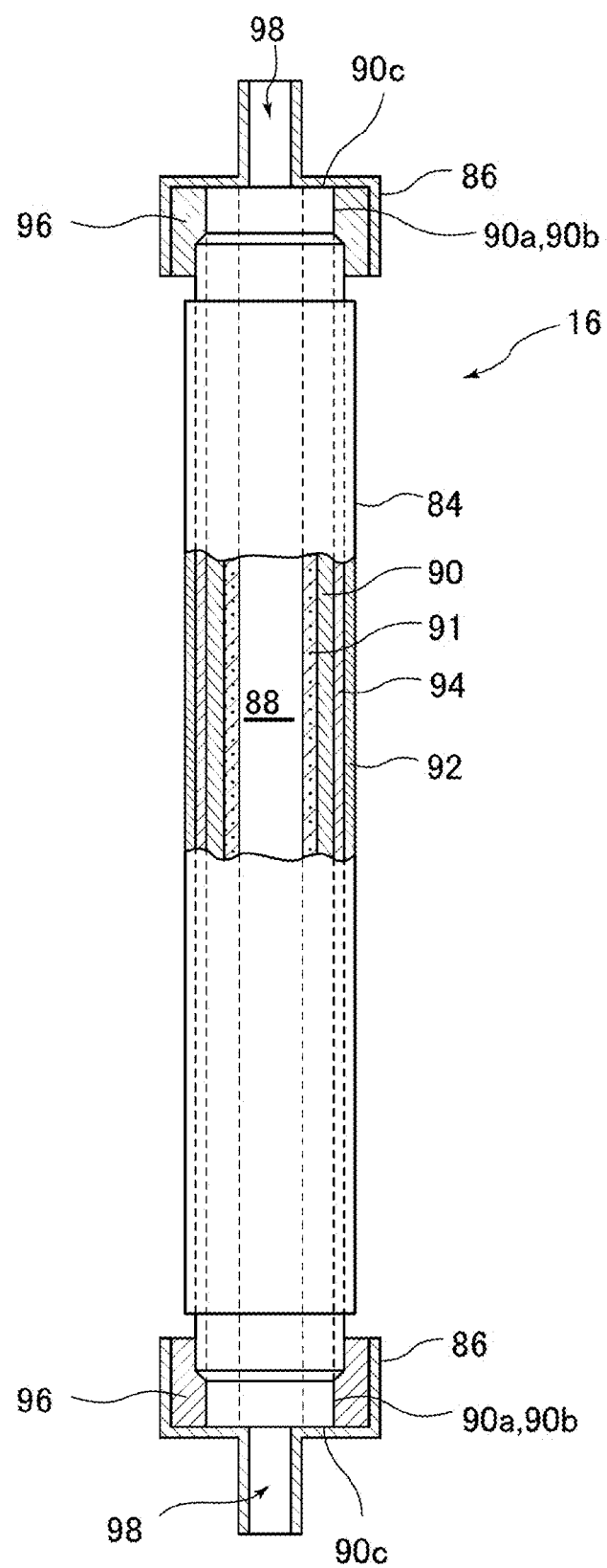
FIG. 5 is a partial cross section showing a fuel cell unit in the solid oxide fuel cell system.

Next, referring to FIG. 5, the fuel cell unit 16 will be described. FIG. 5 is a partial cross section showing the fuel cell unit in the solid oxide fuel cell system. As shown in FIG. 5, the fuel cell unit 16 includes a fuel cell 84 and the fuel electrode terminals 86 respectively connected to top and bottom ends of the fuel cell 84. The fuel cell 84 is a tubular structure extending in the vertical direction, and includes the fuel electrode 90 on a cylindrical porous support 91 defining a fuel gas flow passage 88, the air electrode 92, and a solid electrolyte 94 between the fuel electrode 90 and the air electrode 92.

Since the fuel electrode terminals 86 attached to the top and bottom ends of the fuel cell 84 have the same structure, the fuel electrode terminal 86 attached to the top end will be specifically described here. A top portion 90a of the fuel electrode 90 includes an outside perimeter surface 90b and a top end surface 90c which are exposed to the solid electrolyte 94 and the air electrode 92. The fuel electrode terminal 86 is connected to the outside perimeter surface 90b of the fuel electrode 90 through a conductive seal material 96, and connected directly to the top end surface 90c of the fuel electrode 90 and thereby electrically connected to the fuel electrode 90. A fuel gas flow passage 98 communicating with the fuel gas flow passage 88 of the fuel electrode 90 is formed in a center portion of the fuel electrode terminal 86. The fuel cell of the present invention is used as the fuel cell 84.

Next, a startup mode of the fuel cell system FCS will be described. First, the reforming air flow rate regulator 44, the electromagnetic valve 42, and a mixer 47 are controlled so as to increase the amount of reforming air, and the air is supplied to the reformer 20. Moreover, the power generating chamber 10 is supplied with power generating air through the air guide pipe 76 by controlling the power generating air flow rate regulator 45 and the electromagnetic valve 42. Furthermore, the fuel gas flow rate regulator 38 and the mixer 47 are controlled so as to increase the supply of fuel gas, and the gas to be reformed is supplied to the reformer 20. The gas to be reformed and the reforming air transferred to the reformer 20 are then transferred into the fuel cell units 16 from the respective through holes 69 through the reformer 20, the fuel gas supply pipe 64, and the gas manifold 66. The gas to be reformed and the reforming air transferred into each fuel cell unit 16 pass through the fuel gas flow passage 88 from the fuel gas flow passage 98 formed at the bottom end of the fuel cell unit 16, and flow out of the fuel gas flow passage 98 formed at the top end of the fuel cell unit 16. After that, ignition is brought about by the ignition device 83, and combustion operation is performed on the gas to be reformed, which flows out of a top end of the fuel gas flow passage 98. Thus, the gas to be reformed is combusted in the combustion chamber 18, and the partial oxidation reforming reaction (PDX) takes place.

Then, an auto-thermal reforming reaction (ATR) takes place, provided that the temperature of the reformer 20 reaches approximately 600° C. or higher, and that the temperature of the fuel cell assembly 12 exceeds approximately 250° C. In this event, a premixed gas of gas to be reformed, reforming air and steam is supplied to the reformer 20 by the water flow rate regulator 28, the fuel gas flow rate regulator 38, and the reforming air flow rate regulator 44. Subsequently, a steam reforming reaction (SR) takes place, provided that the temperature of the reformer 20 reaches 650° C. or higher, and that the temperature of the fuel cell assembly 12 exceeds approximately 600° C.

By the switching of the reforming reaction in accordance with the proceeding of the combustion step after the ignition as described above, the temperature in the power generating chamber 10 gradually rises. When the temperature of the power generating chamber 10 reaches a predetermined power generating temperature below the rated temperature (approximately 700° C.) at which the fuel cell module 2 can be stably operated, the electrical circuit including the fuel cell module 2 is closed. Thus, the fuel cell module 2 starts electrical generation, and current flows in the circuit, so that the electrical power can be supplied to the outside.

Furthermore, in the solid oxide fuel cell of the present invention, carbon monoxide generated in the steam reforming reaction and the like is transferred into the fuel cell units 16 through the fuel gas supply pipe 64 and the manifold 66. When carbon monoxide transferred into each fuel cell unit 16 passes through the fuel gas flow passage 88 from the fuel gas flow passage 98 formed at the bottom end of the fuel cell unit 16, a shift reaction represented by the formula (1) takes place between carbon monoxide and water vapor by the catalytic action of the Ni and/or NiO fine particles exposed on the porous support mainly constituted of the sintered compact of the forsterite, the Ni and/or NiO fine particles serving as a reforming catalyst of a shift reaction:

$$CO + H_2O \rightarrow CO_2 + H_2 \qquad (1).$$

This shift reaction converts carbon monoxide and water vapor into carbon dioxide and hydrogen, making it possible to dramatically improve the efficiency of utilizing a raw fuel.

Here, the shift reaction is known to take place in a temperature range of approximately 450° C. to approximately 700° C. In addition, carbon monoxide is difficult to combust as a fuel at a temperature of 700° C. or lower. Thus, the present invention makes it possible to dramatically improve the efficiency of utilizing a raw fuel by reforming carbon monoxide into H2 usable in a power generating reaction particularly in a solid oxide fuel cell active in such a temperature range.

EXAMPLES

The present invention will be described in more details based on the following Examples. Note that the present invention is not limited to these Examples.

Example 1

(Preparation of Green Body for Porous Support)

100 parts by weight of a forsterite powder (having a Mg/Si molar ratio of 1.98, a CaO concentration of 0.02 mass %, an average particle diameter of 2.0 μm) was wet-ground and mixed using a ball mill and was dried by spray-drying to prepare a powder. Then, 100 parts by weight of the powder was mixed with 8 parts by weight of a binder (methyl cellulose-based water-soluble polymer) and 20 parts by weight of a pore forming agent (acrylic resin particles having an average particle diameter of 5 μm) using a high-speed mixer. Further, 20 parts by weight of a solvent (water) was added thereto and mixed together using a high-speed mixer. The mixture thus obtained was kneaded with a kneader and deaerated with a vacuum kneader. Thus, a green body for extrusion was prepared. Here, the average particle diameter was measured according to JIS R 1629, and expressed in a mass median diameter ($D_{50}$) (the same applies hereinafter).

(Preparation of Slurry for Fuel Electrode)

A NiO powder and a 10YSZ (10 mol % $Y_2O_3$-90 mol % $ZrO_2$) powder were wet-mixed in a mass ratio of 65:35 to prepare a dry powder. The average particle diameter was adjusted to be 0.7 μm. Then, 40 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Y_2O_3$-90 mol % $ZrO_2$" means that the concentrations of a Y atom and a Zr atom are respectively 10 mol % and 90 mol % based on a total amount of the Y atom and the Zr atom.

(Preparation of Slurry for Fuel Electrode Catalyst Layer)

A mixture of NiO and GDC 10 (10 mol % $Gd_2O_3$-90 mol % $CeO_2$) was prepared by co-precipitation and then heat treated. Thus, a fuel electrode catalyst layer powder was obtained. The mixing ratio of NiO and GDC 10 was 50/50 by weight. The average particle diameter was adjusted to be 0.5 μm. Then, 20 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Gd_2O_3$-90 mol % $CeO_2$" means that the concentrations of a Gd atom and a Ce atom are respectively 10 mol % and 90 mol % based on a total amount of the Gd atom and the Ce atom.

(Preparation of Slurry for Reaction Prevention Layer)

The material used for a reaction prevention layer was 10 parts by weight of a powder of the aforementioned cerium-based oxide (LDC40, that is, 40 mol % $La_2O_3$-60 mol % $CeO_2$). The powder was mixed with 0.04 parts by weight of a $Ga_2O_3$ powder as a sintering additive, 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "40 mol % $La_2O_3$-60 mol % $CeO_2$" means that the concentrations of a La atom and a Ce atom are respectively 40 mol % and 60 mol % based on a total amount of the La atom and the Ce atom.

(Preparation of Slurry for Solid Electrolyte)

The material used for a solid electrolyte was an LSGM powder having a composition of $La_{0.9}Sr_{0.1}Ga_{0.8}Mg_{0.2}O_3$. Then, 40 parts by weight of the LSGM powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry.

(Preparation of Slurry for Air Electrode)

The material used for an air electrode was a powder having a composition of $La_{0.6}Sr_{0.4}Co_{0.2}Fe_{0.8}O_3$. Then, 40 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry.

(Preparation of Slurry for NiO Catalyst)

With a ball mill, 20 parts by weight of a nickel oxide powder (an average particle diameter of 0.4 μm), and 100 parts by weight of a solvent (ethanol), 2 parts by weight of a binder (ethyl cellulose), and 1 part by weight of a dispersant were fully stirred to prepare a slurry.

(Preparation of Solid Oxide Fuel Cell)

Using the green body and the slurries obtained as described above, a solid oxide fuel cell was prepared by the following method.

The green body for porous support was extruded to form a cylindrical compact. The compact was dried at room temperature, and then heat treated at 1050° C. for 2 hours to prepare a preform. On the preform, a fuel electrode, a fuel electrode catalyst layer, a reaction prevention layer, and a solid electrolyte were formed in that order by slurry coating.

Next, by slurry coating, the slurry for NiO catalyst was impregnated into the gas flow passage side surface of the preform by the upstream half of the length (approximately half the length of an air electrode) for 1 minute to obtain a laminate. Note that when the slurry for NiO catalyst was impregnated, masking had been performed with a water-repellent film on the solid electrolyte side surface of the preform in advance so as to prevent the slurry for NiO catalyst from adhering at the solid electrolyte side surface of the preform.

The obtained laminate was co-fired at 1300° C. for 2 hours. Next, masking was performed on the co-fired laminate so that the area of an air electrode may be 17.3 $cm^2$, and the air electrode was formed on the surface of the solid electrolyte and fired at 1100° C. for 2 hours. It should be noted that the porous support had a length of 200 mm, an outside diameter of 10 mm, and a thickness of 1 mm after co-firing. In the prepared solid oxide fuel cell, the fuel electrode had a thickness of 100 μm, the fuel electrode catalyst layer had a thickness of 10 μm, the reaction prevention layer had a thickness of 10 μm, the solid electrolyte had a thickness of 30 μm, and the air electrode had a thickness of 20 μm. In addition, the presence of NiO fine particles was confirmed in the region where the slurry for NiO catalyst was impregnated into the sintered compact of the forsterite constituting the porous support, the region covering the depth of 50 μm from the surface. Additionally, the outside diameter of the porous support was measured using a micrometer at a portion where no film was formed. Each thickness of the layers was obtained by: cutting the cell after a reforming test, observing the cross section with a SEM at any magnification from 30 to 2000, and then dividing by 2 the sum of the maximum value and the minimum value of the thickness. The cutting point was a central portion of the region where the air electrode was formed. The NiO fine particles were confirmed by observing the cross section using a scanning electron microscope (S-4100 manufactured by Hitachi, Ltd.) at an accelerating voltage of 15 kV with secondary electron images at a magnification of 30,000 or 20,000.

(Reforming Test)

Using the obtained solid oxide fuel cell, reforming test was conducted. The conditions for reforming test were as follows.

Fuel gas: desulfurized municipal gas (13A)+H2O
Evaluation temperature: 700° C.

The discharged gas was recovered to calculate the reformed percentage according to the following formula:

$$\{CO(\text{volume \%}) + CO2(\text{volume \%})\} \div \{CH4(\text{volume \%}) + CO(\text{volume \%}) + CO2(\text{volume \%})\} \times 100.$$

After desulfurization, the municipal gas (13A) was introduced into a vaporizer. $H_2O$ was introduced into the vaporizer using a metering pump. While the vaporizer was heated to around 400° C., the municipal gas and the water vapor were mixed. The mixing ratio was set to be S/C=2.5. S/C means a volume ratio between $H_2O$ and $CH_4$. The outlet of the vaporizer is connected to the fuel cell so that the gas mixture can flow toward the fuel electrode of the fuel cell. The flow rate of the municipal gas was set at 0.1 L/min. The cell was heated in an electric furnace at 700° C. The gas discharged from the fuel electrode side of the cell was cooled by a cooling tower, and recovered into a sampling bag. The quantities of $C_4$, CO, and $CO_2$ were analyzed by gas chromatography (GC) using a thermal conductivity detector (TCD) to calculate the reformed percentage.

Ni Concentration Measurement in Terms of NiO

After the reforming test, a measurement sample was prepared by dividing the fuel cell into two pieces in a longitudinal direction to measure the gas flow passage side surface region of the porous support impregnated with the slurry for NiO catalyst. The instrument used was an X-ray analytical microscope (for example, product name: XGT-5000, maker: HORIBA, Ltd.), one of X-ray fluorescence spectrometers (XRF).

The measurement conditions were as follows.
Measurement time: 100 seconds
Pulsing time: P3
Diameter of field of view measured: 1.2 mm
X-ray tube voltage: 50 kV
Current: 0.032 mA
X-ray filter: none
Quantification: one point calibration curve method.

As the NiO concentration, the mass of NiO was determined from a total amount of all the elements, in terms of oxides, detected from the analysis region.

Ca Concentration Measurement in Terms of CaO

The gas flow passage side surface region of the porous support, the surface having a area of 3 cm×5 cm, impregnated with the slurry for NiO catalyst was ground off to the depth of 100 μm. The resulting powder was mixed with lithium tetraborate in a ratio of 1:1 (mass), and a φ30-mm disc was prepared by pressing. The instrument used was an X-ray fluorescence spectrometer (XRF) (for example, instrument name: scanning X-ray fluorescence spectrometer, product name: ZSX Primus II, maker: Rigaku Corporation).

The measurement conditions were as follows.
Target: Rh
Tube voltage-tube current: 40 KV-75 mA
Analyzing crystal: LiF
Scan range: 110 deg to 116 deg
Quantification: one point calibration curve method Reference material: JCRM R 901 talc powder which is a certified reference material by the Ceramic Society of Japan.

As the CaO concentration, the mass of CaO was determined from a total amount of all the elements, in terms of oxides, detected from the analysis region.

As the measurement results, NiO was 65 mass %, and CaO was 0.02 mass %.

Examples 2 to 7 and Comparative Example 1

Solid oxide fuel cells were prepared in the same manner as in Example 1, except that the CaO concentration of the porous support and the NiO concentration of the slurry for NiO catalyst were adjusted to be values shown in Table 1 below. The reforming test was conducted, and the NiO concentration and CaO concentration were measured. Table 1 shows the result.

TABLE 1

| | NiO (mass %) | CaO (mass %) | Mass ratio of [CaO]/[NiO] | Reformed percentage (%) |
|---|---|---|---|---|
| Example 1 | 65 | 0.02 | 0.0003 | 80 |
| Example 2 | 20 | 0.02 | 0.001 | 75 |
| Example 3 | 65 | 0.4 | 0.006 | 70 |
| Example 4 | 20 | 0.4 | 0.02 | 70 |
| Example 5 | 12 | 0.02 | 0.002 | 63 |
| Example 6 | 5 | 0.02 | 0.004 | 29 |
| Example 7 | 12 | 0.4 | 0.03 | 11 |
| Comparative Example 1 | 10 | 0.4 | 0.04 | 0 |

(SEM Images of Porous Supports of Solid Oxide Fuel Cells)

Figure 7:
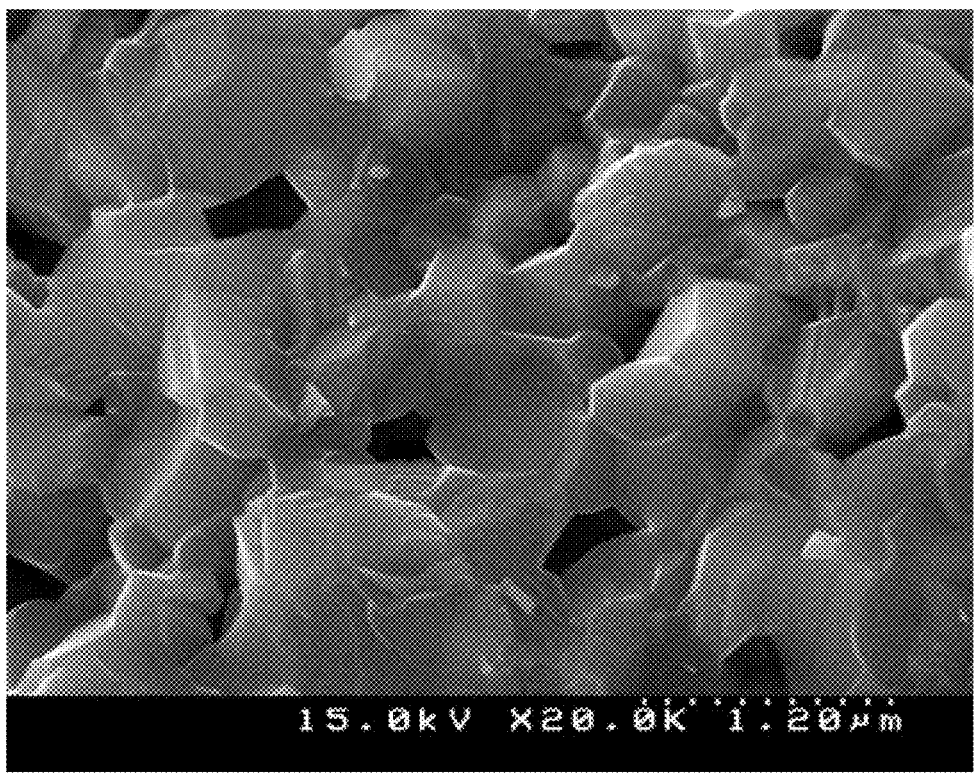
FIG. 7 is a SEM image of a gas flow passage side surface of a porous support before a reforming test.
Figure 8:
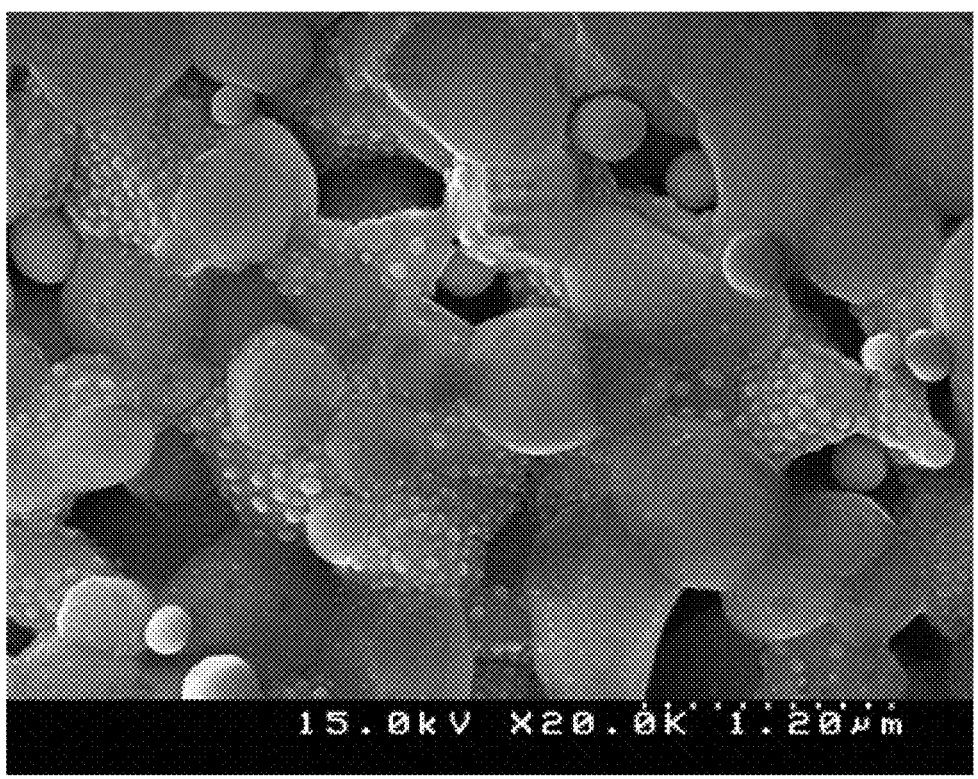
FIG. 8 is a SEM image of the gas flow passage side surface of the porous support after the reforming test.

SEM images of the gas flow passage side surface of the porous support of the solid oxide fuel cell prepared in Example 1 were taken before and after the reforming test (reduction treatment). FIG. 7 shows the SEM image before the reforming test, and FIG. 8 shows the SEM image after the reforming test. It can be seen that Ni and/or NiO fine particles were not present in the porous support before the reforming test; after the reforming test, the porous support had multiple Ni and/or NiO fine particles exposed on the surface of the sintered compact of the forsterite. Some NiO with which the forsterite had been doped were presumably deposited when reduced to Ni in a H2 atmosphere.

Figure 9:
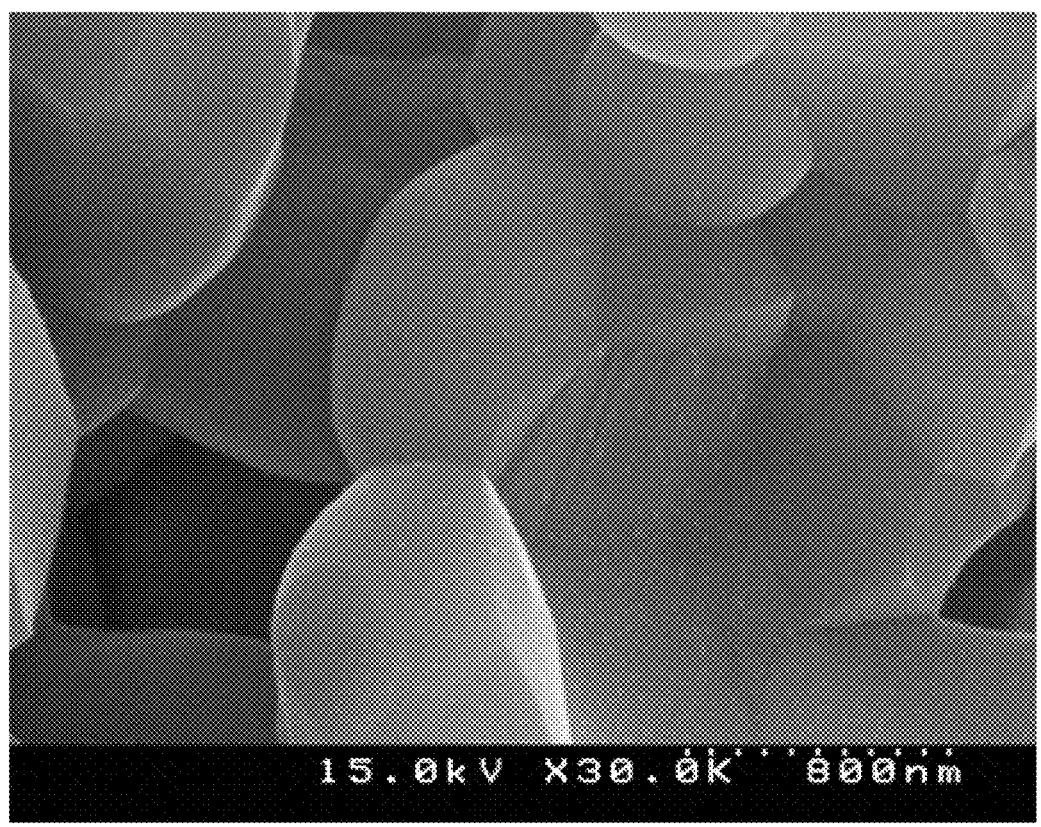
FIG. 9 is a SEM image of a gas flow passage side surface of a porous support after a reforming test.

A SEM image of the gas flow passage side surface of the porous support of the solid oxide fuel cell prepared in Example 4 was taken after the reforming test (reduction treatment). FIG. 9 shows the SEM image. It can be seen that the porous support after the reforming test had a plurality of Ni and/or NiO fine particles exposed on the surface of the sintered compact of the forsterite.

All of these were observed using a scanning electron microscope (S-4100 manufactured by Hitachi, Ltd.) at an accelerating voltage of 15 kV with secondary electron images at a magnification of 30,000 or 20,000.

The porous support of the solid oxide fuel cell prepared in Example 1 was formed to have CaO concentration of 0.02 mass % and NiO concentration of 65 mass % in the gas flow passage side surface of the porous support. If the NiO amount is excessive as in this case, particles on the surface of the sintered compact of the forsterite grow to approximately 100 nm. The EDX (energy dispersive X-ray spectrometry) analysis revealed that these were Ni particles.

On the other hand, the gas flow passage side surface of the porous support of the solid oxide fuel cell prepared in Example 4 includes CaO concentration of 0.4 mass % and NiO concentration of 20 mass %. If a low NiO concentration is added as in this case, white Ni fine particles of several ten nm or smaller are observed on the surface of the sintered compact of the forsterite.

The NiO particles added were approximately 0.4 µm and had a specific surface area of approximately 5 m2/g (according to the BET method). In comparison with this, Ni particles re-deposited on the surface of the sintered compact of the forsterite had a small particle diameter and a large specific surface area, and presumably have a high reforming performance.

Example 8

(Preparation of Green Body for Porous Support)

A forsterite powder (having a Mg/Si molar ratio of 1.98, a CaO concentration of 0.4 mass %, an average particle diameter of 2.0 µm) and a NiO powder (an average particle diameter of 0.4 µm) were wet-ground and mixed in a mass ratio of 80:20 using a ball mill and was dried by spray-drying to prepare a powder. Then, 100 parts by weight of the powder was mixed with 8 parts by weight of a binder (methyl cellulose-based water-soluble polymer) and 20 parts by weight of a pore forming agent (acrylic resin particles having an average particle diameter of 5 µm) using a high-speed mixer. Further, 20 parts by weight of a solvent (water) was added thereto and mixed together using a high-speed mixer to obtain a mixture. The mixture thus obtained was kneaded with a kneader and then deaerated with a vacuum kneader. Thus, a green body for extrusion was prepared. Here, the average particle diameter was measured according to JIS R 1629, and expressed in a mass median diameter ($D_{50}$) (the same applies hereinafter).

(Preparation of Slurry for Fuel Electrode)

A slurry for fuel electrode was prepared in the same manner as in Example 1.

(Preparation of Slurry for Fuel Electrode Catalyst Layer)

A slurry for fuel electrode catalyst layer was prepared in the same manner as in Example 1.

(Preparation of Slurry for Reaction Prevention Layer)

A slurry for reaction prevention layer was prepared in the same manner as in Example 1.

(Preparation of Slurry for Solid Electrolyte)

A slurry for solid electrolyte was prepared in the same manner as in Example 1.

(Preparation of Slurry for Air Electrode)

A slurry for air electrode was prepared in the same manner as in Example 1.

(Preparation of Solid Oxide Fuel Cell)

Using the green body and the slurries obtained as described above, a solid oxide fuel cell was prepared by the following method.

The green body for porous support was extruded to prepare a cylindrical compact. The compact was dried at room temperature, and then fired at 1050° C. for 2 hours to prepare a porous support. On the porous support, a fuel electrode, a fuel electrode catalyst layer, a reaction prevention layer, and a solid electrolyte were formed in that order by slurry coating to thus obtain a laminate.

The obtained laminate was co-fired at 1300° C. for 2 hours. Next, masking was performed on the co-fired laminate so that the area of an air electrode may be 17.3 cm2, and the air electrode was formed on the surface of the solid electrolyte and fired at 1100° C. for 2 hours. It should be noted that the porous support had a length of 200 mm, an outside diameter of 10 mm, and a thickness of 1 mm after co-firing. In the prepared solid oxide fuel cell, the fuel electrode had a thickness of 100 µm, the fuel electrode catalyst layer had a thickness of 10 µm, the reaction prevention layer had a thickness of 10 µm, the solid electrolyte had a thickness of 30 µm, and the air electrode had a thickness of 20 µm. In addition, the outside diameter of the porous support was measured using a micrometer at a portion where no film was formed. Each thickness of the layers was obtained by: cutting the cell after the reforming test on the system, observing the cross section with a SEM at any magnification from 30 to 2000, and then dividing by 2 the sum of the maximum value and the minimum value of the thickness. The cutting point was a central portion of the region where the air electrode was formed.

What is claimed is:

1. A solid oxide fuel cell comprising a porous support, a fuel electrode, a solid electrolyte, and an air electrode, each of the fuel electrode, the solid electrolyte, and the air electrode being sequentially laminated on a surface of the porous support, wherein:

the porous support comprises forsterite and a nickel element,

Ni and/or NiO fine particles are exposed on a surface of a sintered compact of the forsterite, the sintered compact constituting the porous support, and the porous support comprises the forsterite, the nickel element, and a calcium element, a concentration of the calcium element being more than 0mass % but not more than 1 mass % in terms of CaO, and [CaO]/[NiO] is more than 0 but not more than 0.03 by mass ratio in at least one region of the porous support.

2. The solid oxide fuel cell according to claim 1, wherein the surface of the sintered compact of the forsterite is a surface at a gas flow passage side of the porous support.

3. The solid oxide fuel cell according to claim 1, wherein a concentration of the exposed Ni and/or NiO fine particles of an upstream side region of the porous support with regard to the gas flow passage is higher than a concentration of the exposed Ni and/or NiO fine particles of a downstream side region of the porous support with regard to the fuel gas flow passage.

4. The solid oxide fuel cell according to claim 1, wherein the Ni and/or NiO fine particles have a particle diameter of 1 nm to 200 nm both inclusive.

5. The solid oxide fuel cell according to claim 1, wherein the at least one region is a gas flow passage side surface of the porous support.

6. The solid oxide fuel cell according to claim 1, wherein the at least one region is an upstream side region of the porous support with regard to the gas flow passage.

7. The solid oxide fuel cell according to claim 1, wherein the porous support has a concentration of the calcium element of more than 0 mass % but not more than 0.2 mass % in terms of CaO in a fuel electrode side surface of the porous support.

8. The solid oxide fuel cell according to claim 7, wherein the porous support comprises at least two layers.

9. A method for producing a porous support for a solid oxide fuel cell according to claim 1, the solid oxide fuel cell comprising the porous support, a fuel electrode, a solid electrolyte, and an air electrode, each of the fuel electrode, the solid electrolyte, and the air electrode being sequentially laminated on a surface of the porous support, the method comprising:

(a) forming a compact comprising forsterite and a nickel element; and (b) firing the compact, wherein
the porous support further has a concentration of calcium element of more than 0 mass % but not more than 1 mass % in terms of calcium oxide (CaO), and
[CaO]/[NiO] is more than 0 but not more than 0.03 by mass ratio in at least one region of the porous support.

10. The method for producing a porous support according to claim 9, wherein the forming (a) includes:
   (a1) forming a preform by molding a green body comprising forsterite; and
   (a2) incorporating a nickel element into a surface of the preform.

11. The method for producing a porous support according to claim 10, wherein the incorporating (a2) includes applying a slurry containing a compound comprising a nickel element, a solution containing a compound comprising a nickel element, or a green body comprising a nickel element to the surface of the preform.

12. A method for producing a solid oxide fuel cell according to claim 1, the method comprising:
   forming a porous support by the production method according to claim 9; and
   forming a fuel electrode, a solid electrolyte, and an air electrode sequentially on a surface of the porous support.

13. A method for producing the solid oxide fuel cell according to claim 1 comprising a porous support, a fuel electrode, a solid electrolyte, and an air electrode, each of the fuel electrode, the solid electrolyte, and the air electrode being sequentially laminated on a surface of the porous support, the method comprising:
   (a) forming and then firing a compact comprising forsterite and a nickel element to thereby form the porous support, the firing including forming the fuel electrode and the solid electrolyte on the surface of the porous support; and
   (b) forming the air electrode on a surface of the solid electrolyte, wherein the porous support further has a concentration of calcium element of more than 0 mass % but not more than 1 mass % in terms of calcium oxide (CaO), and
   [CaO]/[NiO] is more than 0 but not more than 0.03 by mass ration in at least one region of the porous support.

14. The method for producing a solid oxide fuel cell according to claim 13, wherein the forming (a) includes:
   (a1) forming a preform by molding a green body comprising forsterite;
   (a2) forming a laminate by coating a surface of the preform with a slurry for fuel electrode and a slurry for solid electrolyte, and by incorporating a nickel element into a surface of the preform different from the surface which is coated with the slurries; and
   (a3) firing the laminate.

* * * * *